United States Patent [19]
Mickus

[11] 3,964,326
[45] June 22, 1976

[54] ONE PIECE STAMPED PULLEY

[75] Inventor: Frank Mickus, Stickney Township, Cook County, Ill.

[73] Assignee: Borg-Warner Corporation, Chicago, Ill.

[22] Filed: Dec. 30, 1974

[21] Appl. No.: 537,232

Related U.S. Application Data

[62] Division of Ser. No. 425,453, Dec. 17, 1973, Pat. No. 3,893,818.

[52] U.S. Cl. ................................ 74/230.05; 74/230.8
[51] Int. Cl.² ...................... F16H 55/44; F16H 55/36
[58] Field of Search......... 74/230.05, 230.01, 230.8, 74/230.3, 230.14; 29/159 R, 505

[56] References Cited
UNITED STATES PATENTS

| | | |
|---|---|---|
| 1,494,409 | 5/1924 | Bidle ................................ 29/159 R |
| 2,006,281 | 6/1935 | Schwarz ............................ 29/159 R |
| 3,080,644 | 3/1963 | Pievite et al. ................. 74/230.01 X |
| 3,700,382 | 10/1972 | Pacak ............................... 29/159 R |
| 3,828,619 | 8/1974 | Frost et al. ....................... 74/230.01 |

*Primary Examiner*—Samuel Scott
*Assistant Examiner*—A. Russell Burke
*Attorney, Agent, or Firm*—Herman E. Smith

[57] ABSTRACT

A rotary member such as a wheel, clutch disc, V-pulley and the like which can be formed from a sheet metal stamping. Method and apparatus are disclosed for forming an integral hub having a wall thickness greater than the sheet stock from which it is made. Method and apparatus are disclosed for forming a V-pulley from a sheet metal blank by plastically flowing and spin forming the blank to provide an increase in the thickness of the groove walls.

2 Claims, 21 Drawing Figures

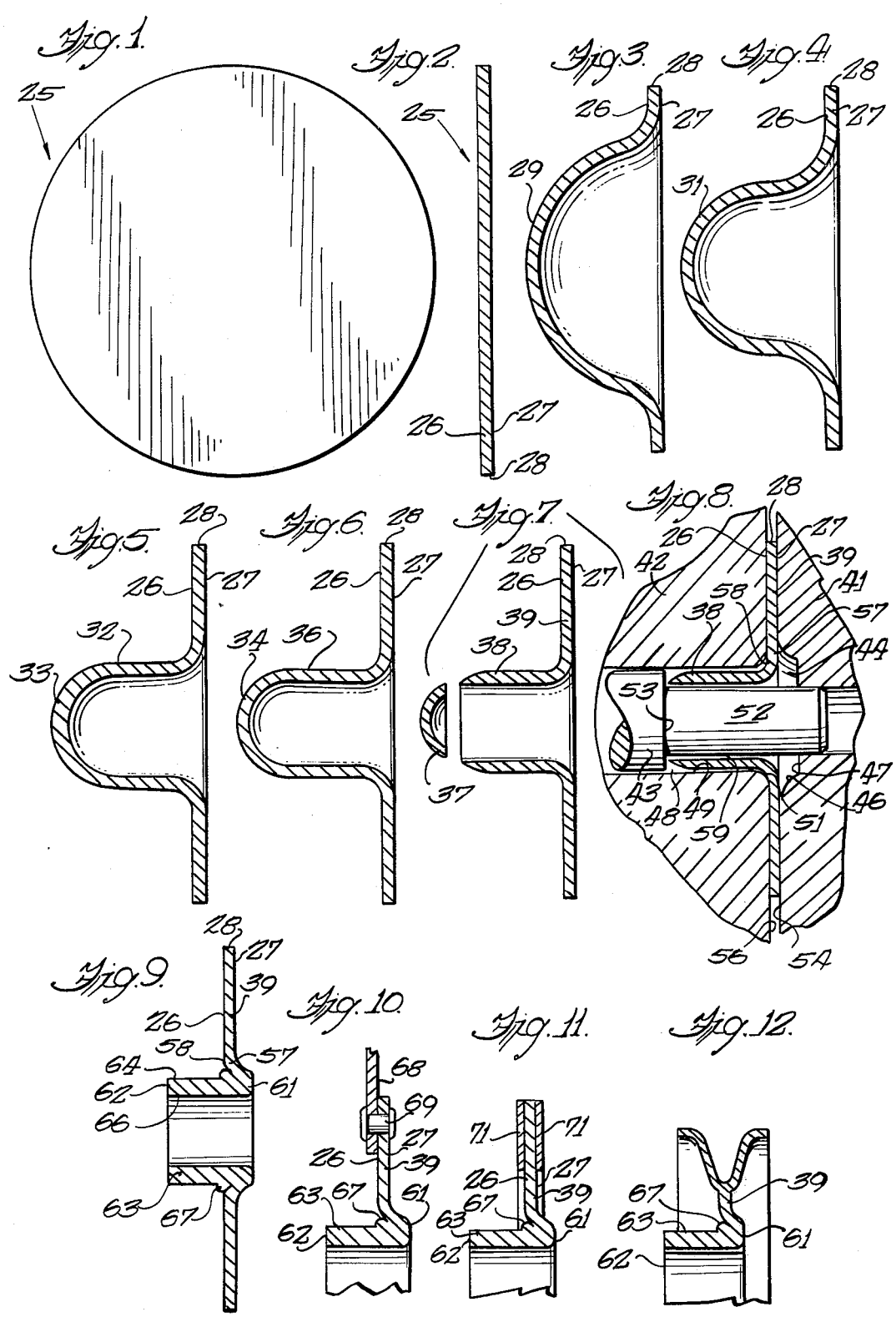

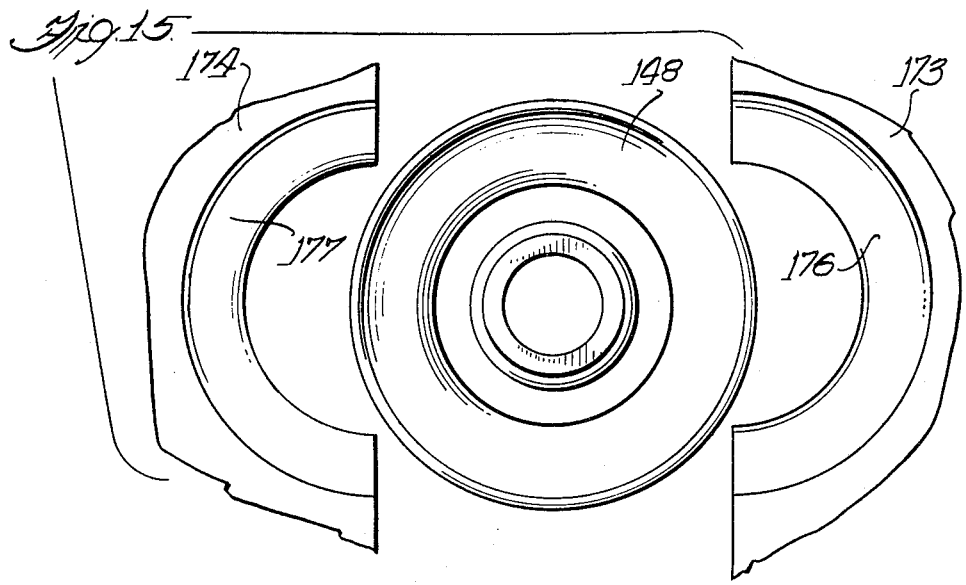
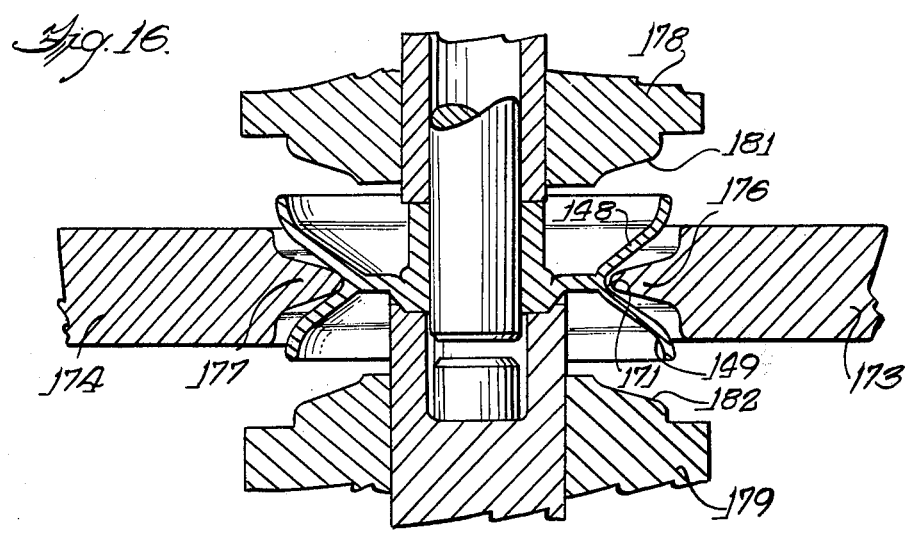
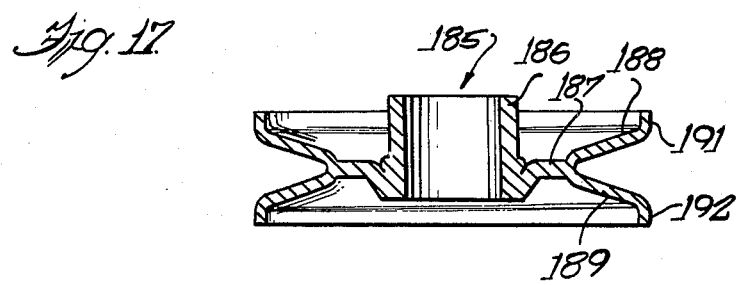

ONE PIECE STAMPED PULLEY

This is a division of application Ser. No. 425,453 filed Dec. 17, 1973, now U.S. Pat. No. 3,893,818 issued on July 8, 1975.

BACKGROUND OF THE INVENTION

The present invention relates to rotary members and methods and apparatus for forming such members from sheet metal.

It is known to provide rotary members such as wheels, pulleys, clutch discs and the like, having an integral hub formed from sheet metal stock. It is also known to provide V-groove pulleys and the like, formed from a sheet metal blank by splitting the blank edgewise to form the walls of the groove.

According to the prior art, the articles have a wall thickness equal to or less than the thickness of the stock from which it is made. For example, where an integral hub is formed by drawing, the wall thickness of the hub may be thinner than the blank from which it is made. Where a disc is split to form a V-groove, the thickness of each wall is generally half or less than half the thickness of the stock from which it is made. Thus the stock from which the article is made must be selected to provide the desired thickness in the thinnest section of the finished article.

SUMMARY OF THE INVENTION

The present invention relates to rotary members having selectively thickened wall portions as well as to method and apparatus for forming such members from sheet metal.

In the formation of an integral hub, the material is coined to generally increase the wall thickness of the hub as well as providing a collar-like annular ridge. In the formation of a groove, the groove walls are formed and thickened by spreading and spin forming in a roll forming operation.

Among the advantages of the present invention are the conservation of material in that material waste is reduced in the manufacturing process, and in that a strong light weight article is provided which is desirable for reducing weight and rotary inertia.

BRIEF DESCRIPTION OF THE DRAWINGS

FIG. 1 shows a plan view of a circular sheet metal blank;

FIG. 2 is a section view of the sheet metal blank shown in FIG. 1;

FIGS. 3 through 6 indicate successive steps in draw forming the blank;

FIG. 7 indicates a further step in forming an integral hub in the blank;

FIG. 8 is a fragmentary view of coining dies for forming a hub of a desired shape;

FIG. 9 is a section view of a rotary member including an integral hub and annular web;

FIGS. 10, 11 and 12 are fragmentary section views illustrating articles formed by further processing of the annular web;

FIG. 15 is a fragmentary plan view of coining dies in the open position for forming a groove of a desired shape;

FIG. 16 is a fragmentary elevation view, in section, of the coining dies shown in FIG. 15;

FIG. 17 is a section view of a V-groove pulley formed by the coining die of FIGS. 15 and 16;

DESCRIPTION OF THE PREFERRED EMBODIMENTS

Figure 13:
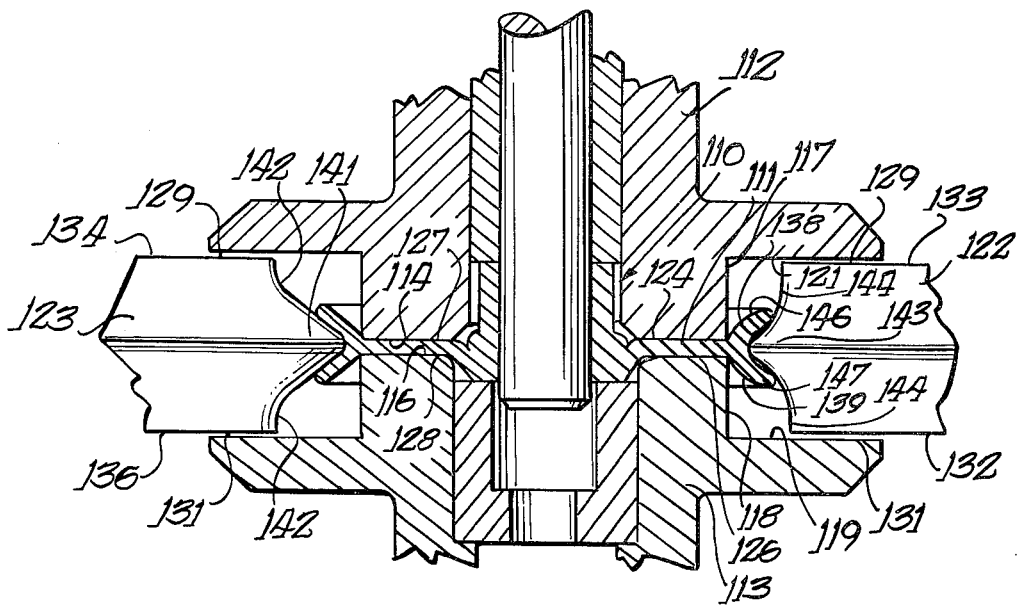
FIG. 13 is a fragmentary section view of anvil dies and forming rollers illustrating a first step in roll forming a groove in an annular web.

Referring to the drawings, a round sheet metal disc 25 is shown in FIGS. 1 and 2. The disc has opposite surfaces 26, 27 and a peripheral edge 28. A central portion of the disc is subjected to a first step of a conventional draw forming operation to produce a bowl-like configuration as indicated by reference character 29 in FIG. 3. The disc is then subjected to a further step of a conventional draw forming operation to form a deeper bowl portion of smaller diameter as indicated by reference character 31 in FIG. 4. The blank is then subjected to a further draw forming operation to provide a projection having a substantially cylindrical wall portion 32 closed by a bowl-like end portion 33, the cylindrical wall portion extending substantially perpendicularly from the plane of the blank or disc defined by surfaces 26, 27 as shown in FIG. 5. The blank is subjected to a still further draw forming operation providing a reduction in the diameter of the cylindrical wall portion resulting in a configuration including a bowl-like end 34 closing a cylindrical sidewall 36 as indicated in FIG. 6. The blank is then subjected to a step of a punch press operation to remove an end portion 37 leaving a blank having a tubular portion extending perpendicularly therefrom as indicated in FIG. 7. The operations described thus far are well known processes in the metal forming trades and it is thought a more detailed description of the process is unnecessary.

Following the formation of a blank having an integral annular web 39 and tubular extension 38, a coining die is provided as illustrated in FIG. 8 comprising a first die member 41, a second die member 42 and a third ram-like die member 43. First die member 41 has a clamping face 54 and includes a cavity 44 defined by wall portions 46, 47. Second die member 42 has a clamping face 56 and includes a cavity 48 defined by a cylindrical wall 49 and chamfer or radius 51. Third die portion 43 includes a nose portion 52 having a cylindrical wall 59 and a shoulder portion 53 and is adapted to be moved longitudinally with respect to die portions 41, 42.

The annular web portion 39 of the blank is clamped between faces 54, 56 of die members 41, 42 with tubular extension 38 disposed in cavity 48 of die member 42. The third die member 43 is inserted through the tubular extension 38 with its shoulder 53 facing cavity 44. Thereafter, third die member 43 is forcibly moved inwardly while its shoulder 53 is in engagement with tubular extension 38. An inner portion 57 of web 39 is forced into cavity 44 until the surface of the blank becomes conformed with cavity surfaces 46, 47. Movement of die member 43 continues, resulting in plastic flow of material in tubular extension 38 to conform with the cylindrical walls 49, 59 thereby thickening the wall of the tubular portion while fixing the location of the end surfaces thereof with respect to annular web 39. In addition to increasing the wall thickness of the tubular extension, an annular ridge or collar is formed adjacent chamfer 51 and an inner portion 58 of surface 26 where the deformed inner portion 57 of the web forms a junction with the tubular extension which has now been formed into an integral hub extending on both sides of web 39.

The integral annular web and hub formed in the coining die of FIG. 8 is shown in FIG. 9, wherein the hub includes an end surface 61 formed by die surface 47, a second end surface 62 formed by die shoulder 53, a thickened wall 63 defined by cylindrical surfaces 64, 66 and formed by die surfaces 49, 59 and an integral protuberant ridge or collar portion 67 formed by web surface 58 and die chamfer or radius 51.

Thus a rotary member is provided having selected wall portions of greater thickness than other portions of its wall and greater than the thickness of the stock from which it is made. In particular, the locally thickened collar or ridge portion 67 supports web 39 providing a more rigid structure.

Following the formation of the hub structure as described above, the web portion 39 can be subjected to further manufacturing steps. For example, the hub may be fastened to a plate member 68 as indicated by rivet 69 in FIG. 10, or it may have a friction facing 71 bonded thereto to form a clutch member as indicated in FIG. 11, or the web may be subjected to metal forming operations such as to form impeller blades, sprocket teeth, or to form a V-groove pulley as indicated in FIG. 12.

The invention further includes the formation of a V-groove pulley from a sheet metal disc by a roll forming process in which the walls of the V-groove become thicker during the process of manufacturing, that is to say each wall becomes greater than half the thickness of the material from which it is made. While the process of forming a V-groove can be used with many forms of blanks, it is preferred to provide a blank having a thickened intergral hub as described above.

Referring now to FIGS. 13 through 16, a blank 110 including a sheet metal web portion 111 is confined within anvil dies and subjected to roll forming and coining as described in more detail hereinafter.

As shown in FIG. 13 the blank 110 is placed on a lower rotatable anvil die 113 and an upper rotatable anvil die 112 is lowered to confine a substantial portion of web 111 between annular die faces 114, 116 leaving an outer peripheral margin of web 111 extending outwardly beyond faces 114, 116 as defined by cylindrical surfaces 117, 118. Preferably, anvil die 113 includes a guide surface 119 and anvil die 112 includes a corresponding guide surface 121 which, when closed, form guide surfaces for guiding a forming roller or rollers 122, 123 into engagement with a mid portion of the edge of the blank. Lower anvil die 113 is driven rotationally, but is stationary axially. Upper anvil die 112 is driven rotationally and is movable axially for confining and releasing the web 111. Preferably oil films 124, 126 are provided between die faces 114, 116 and corresponding web surfaces 127, 128. Similarly, it is desirable to provide oil films 129, 131 between die surfaces 119, 121 and surfaces 132, 133 of roller 122 as well as between die surfaces 119, 121 and roller surfaces 134, 136. An oil film between a die surface and a roller surface provides a viscous drive by means of which a die can be driven by a rotating roller. If desired, the roller and dies can be submerged in an oil bath while roll forming is being performed.

Initially blank 110 is placed on lower rotating die 113 and the oil film 126 acts in the manner of a viscous clutch to impart a spinning motion to the blank. Thereafter upper die 112 is lowered to a confining position with respect to the blank and oil film 124 further increases the clutching action to drive the blank at the rotary speed of the dies.

Thereafter a powered roller or rollers 122, 123 are fed toward the axis of rotation of the blank performing a roll forming operation on the exposed outer peripheral margin of the blank. It is preferred that the forming rollers have a median ridge defined by the intersection of curvilinear sidewalls. The rollers are driven at a speed which provides a linear velocity at the perimeter of the ridge which is substantially equal to the initial linear velocity of the outer edge of the spinning blank. Thus when a roller contacts the edge of the blank, little or no slippage takes place between the blank and roller thereby permitting a rolling action to occur. As the roller moves inwardly toward the axis of the blank, the speed of the roller determines the rotary speed of the blank which slips with respect to anvil dies 112, 113 on oil films 124, 126. It is preferred that the rollers be driven toward the axis of rotation of said blank with a constant feed force and allowed to vary in rate of feeding movement in accordance with the resistance encountered in roll forming the blank.

It is preferred to provide a combination of roller contour, rotational speed and feed force which in combination with the physical properties of the blank results in plastic flow of the material ahead of the roller ridge thereby decreasing the diameter of the blank while increasing the thickness of the blank while spreading the thickened portion to provide a pair of diverging sidewalls, and simultaneously spin forming the sidewalls to reduce the diameter thereof while maintaining the thickness of the previously thickened sidewalls resulting in cup-like formations 138, 139 extending from the web.

Figure 14:
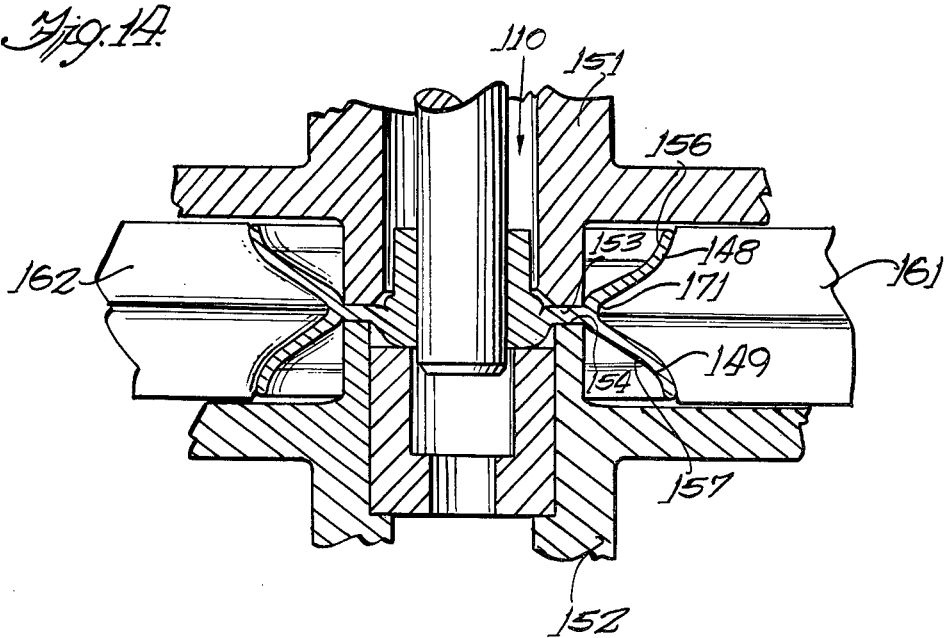
FIG. 14 is similar to FIG. 13 illustrating a further step in roll forming a groove in an annular web.

It is preferred to carry out the roll forming operation in two steps as indicated by FIGS. 13 and 14 of the drawings. In the first step as shown in FIG. 13, the web 111 is confined between die faces 114, 116 to permit only a limited outer peripheral margin to extend therefrom for working by the roller or rollers. Confinement of the web avoids axial bending or tuliping of the web while being roll formed.

The roll forming can be carried out by a single forming roller or by a group of forming rollers having similar or different contours. It is preferred to employ a pair of forming rollers of different contours in the first step of roll forming shown in FIG. 13. As shown, roller 123 is provided with a wide nose portion 141 and deep shoulder portions 142 while roller 122 is provided with a relatively narrower nose portion 143 and relatively shallow shoulders 144. The width of the nose portion is a determining factor in controlling the thickening of the material, a wider roller providing greater thickness, while the combination of a wide and narrow roller provides a thickness intermediate that thickness which would be provided by either if used alone. Where a pair of forming rollers is employed, it is desirable to provide a common force for feeding both rollers such that the rate of feed of each roller varies independently in accordance with the resistance encountered by that roller. An advantage to be gained from the use of two rollers having a common feeding force, is that the rollers can be placed opposite each other thereby balancing each other so as to avoid stresses and the like at the center of the blank. A further advantage of using dissimilar rollers in the first roll forming step is that the wider roller can be provided with a contour similar to the contour of the roller or rollers to be used in the second step of roll forming.

A second step of roll forming is shown in FIG. 14 where the blank formed as in FIG. 13 has been transferred to a second set of anvil dies 151, 152 similar to anvil dies 112, 113 but having smaller annular surfaces 153, 154. In the second roll forming step, a further inner concentric annular portion of the web extends outwardly from die faces 153, 154 to be worked by one or a pair of forming rollers 161, 162. It is preferred that the contour of rollers 161, 162 be the same as the contour of roller 123 employed in the first step of roll forming, particularly that portion of the roller contour which shapes the flanged sidewalls 146, 147 in the first step of roll forming. Thus it is possible to achieve smooth feeding of the rollers in the second step since the rollers will engage preformed flanges 146, 147.

During the second step of roll forming, the rollers are fed further inwardly toward the axis of the blank reducing the diameter of the root portion 171 while spreading the web to increase the thickness of the material, and spin forming the flanged sidewalls 148, 149 to reduce the diameter of the deeper cup portions 156, 157. Roll forming is continued until the desired diameter of root 171 is reached. At this point the flanged sidewalls 148, 149 have been subjected to a spin forming operation for the purpose of maintaining wall thickness and may therefore be of a contour differing from a desired final contour.

As illustrated in FIGS. 16 and 17, coining dies are employed for imparting a desired shape to a groove formed between sidewalls 148, 149. A pair of split die members 173, 174 are provided with arcuate portions 176, 177 having the profile of the groove desired to be formed between sidewalls 148, 149. Die members 173, 174 are moved radially toward the axis of the blank to form a closed ring around root portion 171. A further pair of die members 178, 179 include surfaces 181, 182 having profiles complementary to the profile of die portion 176, 177. Die members 178, 179 are moved axially toward each other and toward die portions 173, 174 reforming sidewalls 148, 149 to a desired shape.

A V-groove pulley 185 formed by the above described process is shown in FIG. 17 including a hub portion 186, an annular web portion 187, divergent sidewalls 188, 189 and rim portions 191, 192. As shown, the hub portion 186 and web portion 181 are in the form shown in FIG. 9.

Figure 18:
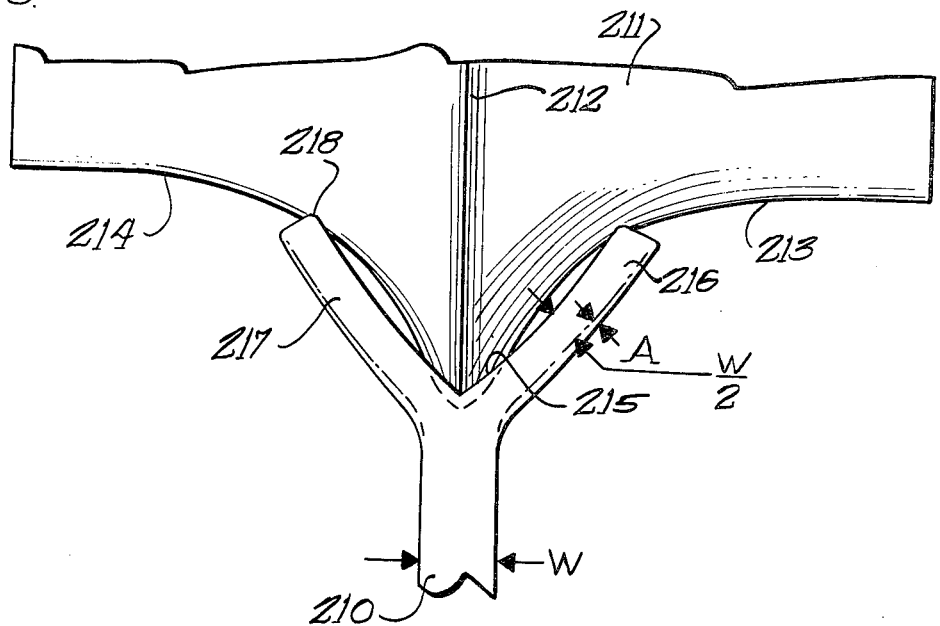
FIG. 18 is a diagramatic view illustrating roll forming of a groove.
Figure 19:
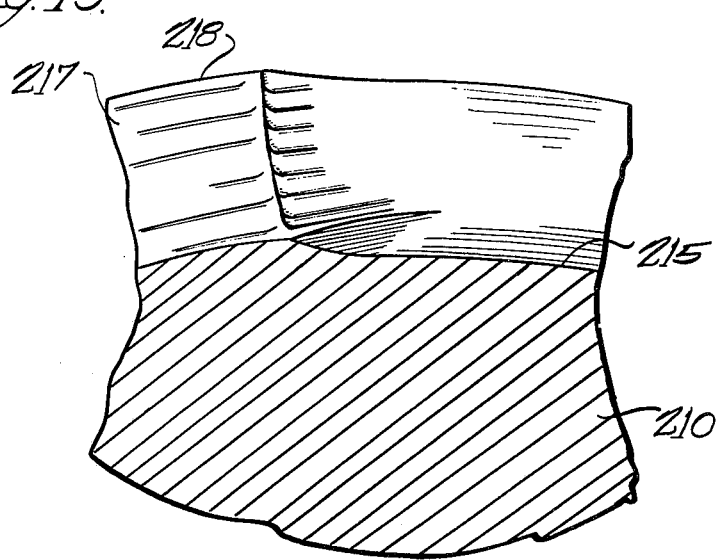
FIG. 19 is an enlarged fragmentary view illustrating roll forming of a groove.

Referring now to FIG. 18 a diagram is shown indicating thickening of the walls during formation of a V-groove. A sheet metal disc 210 has a thickness W which may be for example 0.105 inches. A roller 211 having a ridge 212 and curvilinear sidewalls 213, 214 is forced edgewise into the disc. The ridge portion of the roller causes the material in the root 215 to flow plastically inwardly and axially resulting in diverging sidewalls 216, 217 having a thickness greater than half the thickness of the disc from which it is formed. For example where the thickness of the disc W is 0.105 inches, the thickness of each sidewall W/2 + A can equal 0.060 inches, or a thickening of approximately 15 percent. The thickening is accounted for by displacement of material ahead of the roller. It should be recognized that if the portion of the disc below the root is reduced in diameter to cause thickening, the sidewalls 216, 217 would tend to pull away from the central part of the web or to stretch and become thinner thereby destroying the gain in wall thickness. This problem is avoided by simultaneously spin forming the walls 216, 217 by engagement with profiled side surfaces of the forming roller. A sidewall such as 217 is displaced axially by a nose portion of the roller while its outer perimeter 218 is displaced radially. Where wide and narrow rollers are used as in the step shown in FIG. 13, the wide roller can be used to provide axial displacement of sidewalls while the roller with shallow shoulders can be used for radial displacement of the sidewalls. Where a single roller or a pair of identical rollers are employed, the configuration of the roller profile is selected such as to impart the desired degree of both axial and radial displacement of the groove sidewalls at the same time.

Figure 21:
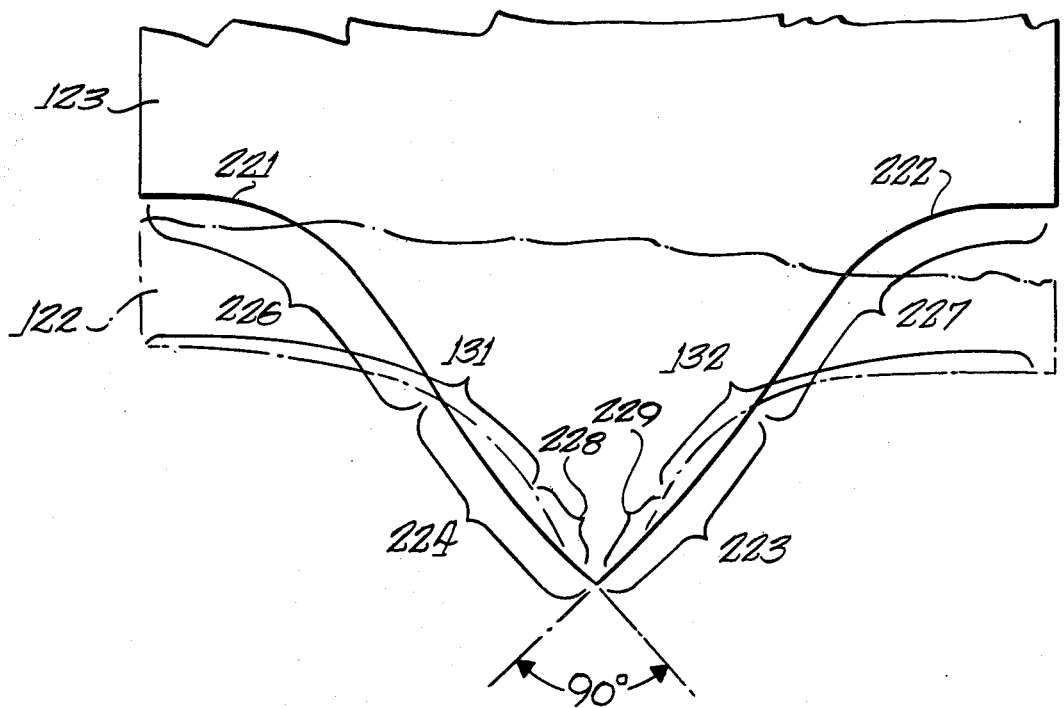
FIG. 21 indicates, to enlarged scale, the profiles of forming rollers for roll forming a groove.

Profiles of desirable wide and narrow rollers are shown to enlarged scale in FIG. 21 where a wide roller profile is indicated in solid line and a narrow roller profile is indicated in broken line. A wide roller such as 123 is shown as having a pair of intersecting curvilinear side surfaces 221, 222 each defined by first convexly curved intersecting portions 223, 224 merging into concavely curved portions 226, 227, the concavely curved portions forming spaced shoulders while the convexly curved portions intersect each other at approximately right angles to provide an edge or ridge having an included angle of approximately 90 degrees.

While the narrow roller 122 is of different size, its contour is also formed by intersecting convex side surfaces such as 228, 229 merging into concavely curved side surfaces 131, 132 providing shoulders for spin forming the sidewalls of the blank.

Figure 20:
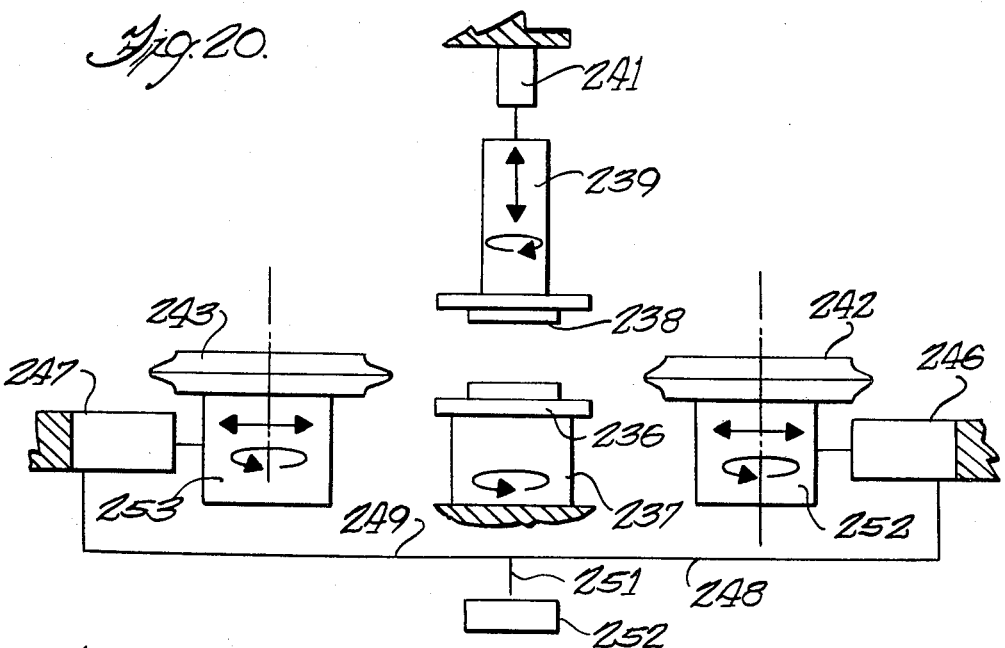
FIG. 20 is a schematic view of apparatus for roll forming a groove.

Referring now to FIG. 20, a schematic diagram of apparatus used in roll forming a groove is indicated. A lower anvil die 236 is vertically stationary and can be driven for rotation by a motor means 237, or the die can be frictionally driven by rollers 242, 243 through the oil film. An upper anvil die 238 is driven for rotation by a motor means 239 and is movable upwardly and downwardly for movement from and toward anvil die 236. A biasing member 241 is provided for exerting a confining force when the dies are brought together to confine the web portion of a blank.

A pair of forming rollers 242, 243 are mounted for feeding movement toward and from the axis of anvil dies 236, 238. Feed members 246, 247 are preferably expansible chamber fluid motor devices having equal working areas, and have common connection 248, 249, 251, to a common source of fluid power 252 such that the feed rate of each roller is determined by the resistance encountered by the roller. Each roller is driven rotationally by a motor such as 252 and 253.

Thus rotary articles have been described which are formed from thin stock with portions of the walls selectively thickened as well as method and apparatus for making such articles.

What is claimed is:

1. A rotary member including an annular web portion surrounding an integral hub portion extending axially outwardly of each side surface of said web portion, said web portion merging into said hub portion adjacent one side surface thereof, said hub portion including an integral protuberant ridge portion abutting said web portion adjacent the other side surface thereof defining a collar portion supporting said web portion.

2. A rotary member according to claim 1 wherein the outer portion of said annular web portion includes a groove, said integral protuberant ridge portion defining an integral web supporting collar disposed radially inwardly of said groove.

* * * * *